United States Patent [19]

Smith

[11] 4,350,771

[45] Sep. 21, 1982

[54] OXIDATION RESISTANT SILICON NITRIDE CONTAINING RARE EARTH OXIDE

[75] Inventor: J. Thomas Smith, Acton, Mass.

[73] Assignee: GTE Laboratories Incorporated, Waltham, Mass.

[21] Appl. No.: 303,445

[22] Filed: Sep. 18, 1981

Related U.S. Application Data

[63] Continuation of Ser. No. 944,515, Sep. 20, 1978, abandoned.

[51] Int. Cl.³ ...................... C04B 35/50; C04B 35/58
[52] U.S. Cl. .................................................... 501/97
[58] Field of Search .................................... 501/97, 98

[56] References Cited

U.S. PATENT DOCUMENTS

| | | | |
|---|---|---|---|
| 3,830,652 | 8/1974 | Gazza | 501/98 |
| 4,099,979 | 7/1978 | Lange et al. | 501/97 |
| 4,102,698 | 7/1978 | Lange et al. | 501/98 |

OTHER PUBLICATIONS

Priest, H. F. et al.; "Sintering of $Si_3N_4$ Under Nitrogen Pressure," Journal American Ceramic Society, vol. 60, Nos. 1-2, p. 81 (1977).

Rice et al., "Hot Pressed $Si_3N_4$ with Zr Based Additions," Journal American Ceramic Society, vol. 58, Nos. 5-6, p. 264 (1975).

Primary Examiner—M. L. Bell
Attorney, Agent, or Firm—Jerry F. Janssen

[57] ABSTRACT

$Si_3N_4$ polycrystalline ceramic bodies formed from starting materials containing about 2 to 4 weight percent $SiO_2$, less than 0.1 weight percent cation impurities and $Y_2O_3$ in critical amounts exhibit optimum oxidation resistance. Such bodies are useful as engine parts or components or as regenerator structures for waste heat recovery.

4 Claims, 2 Drawing Figures

OXIDATION RESISTANT SILICON NITRIDE CONTAINING RARE EARTH OXIDE

This is a continuation of application Ser. No. 944,515, filed Sept. 20, 1978, now abandoned.

FIELD OF THE INVENTION

This invention relates to polycrystalline bodies of silicon nitride ($Si_3N_4$) and more particularly relates to such bodies containing critical amounts of $Y_2O_3$ to obtain optimum oxidation resistance.

PRIOR ART $Si_3N_4$ powder characterized by cation impurities of 0.1 weight percent or less, a morphology of predominately crystalline alpha phase and/or amorphous phase and fine particle size (3 microns or less average particle size as determined by B.E.T.), when consolidated with an additive such as MgO or $Y_2O_3$ and sintered, is known to enable production of polycrystalline bodies approaching theoretical density. See U.S. Pat. No. 4,073,845, issued to S. T. Buljan et al. on Feb. 14, 1978, and assigned to GTE Sylvania Inc. Such powders may be consolidated into dense bodies by either hot pressing at less severe temperature and pressure conditions than are necessary with less pure and less reactive powders, or by cold pressing and sintering, which is not possible with some less pure and less reactive powders. In the fabrication of such polycrystalline bodies, up to 25 weight percent of yttrium oxide or a lanthanide rare earth oxide such as $CeO_2$ is typically added as a sintering or densifying aid. While such modifying additives are thought to deleteriously affect maximum attainable high temperature strength and creep resistance, nevertheless such additives are thought essential to achieve highest densities, that is, densities approaching theoretical, which densities are also critical to the achievement of high temperature strength.

A related property which is highly desirable for such bodies exhibiting high strength at high temperatures is resistance to oxidation, particularly when considering the effect of such oxidation in a corrosive environment expected to be encountered in certain envisioned applications, as for example, as parts in automotive engines operating at temperatures above those hospitable to super alloy materials. The resistance to oxidation of such bodies should be sufficient to avoid significant degradation of mechanical strength properties over long periods of time in such operating environments. Unfortunately, it has been found that certain dense $Si_3N_4$ bodies containing rare earth oxide additives, while initially exhibiting excellent high temperature strength, also exhibit only fair to poor oxidation resistance.

SUMMARY OF THE INVENTION

In accordance with the invention, it has been discovered that maintaining yttrium oxide ($Y_2O_3$) within a critical range in polycrystalline $Si_3N_4$ bodies produced from reactive $Si_3N_4$ powder containing up to 0.1 weight percent of cation impurities and between about 2 and 4 weight percent $SiO_2$, enables optimization of oxidation resistance in such bodies, making them particularly useful in applications requiring maintenance of good to excellent mechanical strength at high temperatures over significant periods of operating life. Such applications include vehicular and aerospace engine and related structural parts, regenerators and recuperators for waste heat recovery, etc. As used herein, the term "reactive powder" means powder having an average particle size less than 3 microns as determined by B.E.T. analysis, and having a morphology of substantially crystalline alpha phase and/or amorphous phase. Herein, the term "amorphous" refers to a short range order solid material as indicated by its lack of x-ray diffraction intensity peaks and by broad infrared absorption peaks. The term "$Si_3N_4$ body" means a polycrystalline of $Si_3N_4$ grains and a second intergranular phase containing $SiO_2$, intentional additives and unintentional impurities. The terms "crystalline" and "polycrystalline" describe a solid composed of atoms, ions or molecules arranged in a pattern which is repetitive in three dimensions and exhibits distinct x-ray diffraction intensity peaks characteristic of the crystal structure.

More specifically, it has been discovered that $Y_2O_3$ should be maintained below the level at which the 1:1 compound, $Si_3N_4 \cdot Y_2O_3$, is likely to form, since this compound has been found to have a deleterious effect upon the oxidation resistance of the body.

DETAILED DESCRIPTION OF THE INVENTION

Figure 1:
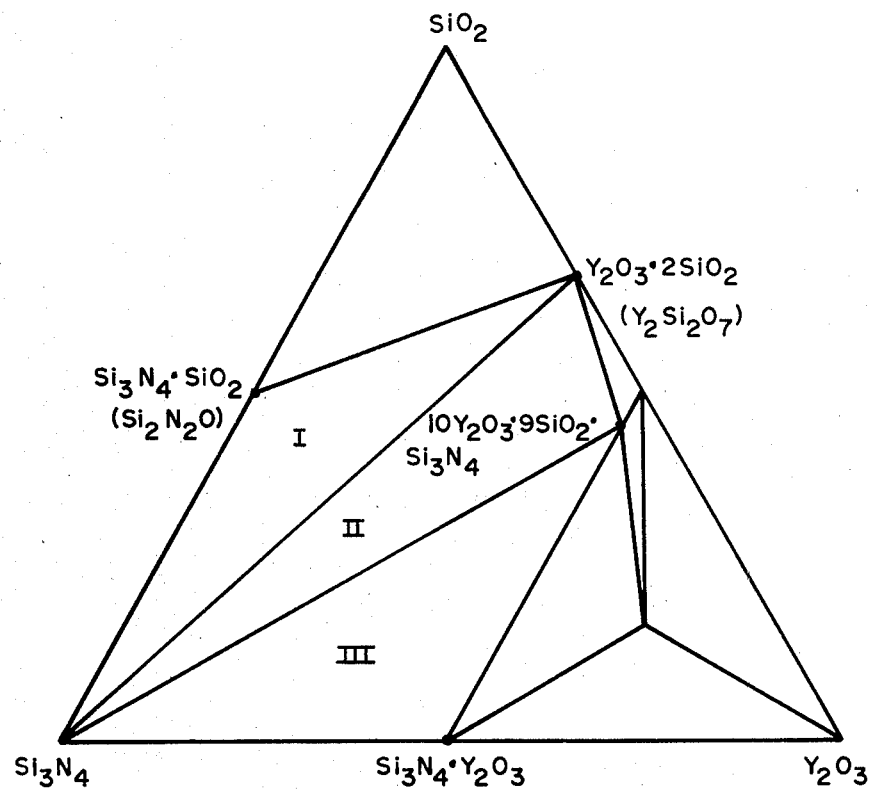
FIG. 1 is a pseudoternary diagram for $Si_3N_4$, $SiO_2$, and $Y_2O_3$, showing phase relationships and certain binary and ternary compounds within the phase diagram.

For a better understanding of the present invention, together with other and further objects, advantages and capabilities thereof, reference is made to the following disclosure and appended claims in connection with the above-described Drawing.

The $Si_3N_4$ starting material may be amorphous material, amorphous material which has been partly crystallized by heat treatment, or may be a mixture of substantially completely amorphous material and substantially completely crystalline material. A method for obtaining the $Si_3N_4$ powder of the requisite purity, morphology and particle size is described in detail in U.S. Patent application Ser. No. 625,330, filed Oct. 23, 1975, assigned to GTE Sylvania Inc., now abandoned.

In the examples which follow herein, compositions are prepared by hot pressing. While a general procedure is outlined for hot pressing, it is to be understood that alternate processes for producing $Si_3N_4$ bodies are also suitable in the practice of the invention, for example, hot isostatic pressing or any pressureless sintering step preceded by a suitable consolidation step such as dry pressing, isostatic pressing, extruding, slip casting, injection molding, etc. See U.S. Pat. No. 4,073,845 for a general procedure for pressureless sintering of silicon nitride bodies.

A general procedure for hot pressing will now be described. Silicon nitride powder consisting of 30 to 40 weight percent amorphous silicon nitride, remainder crystalline silicon nitride, with about 95% of the crystalline silicon nitride being the alpha phase, 100 parts per million cation impurities and about 2 to 4 weight percent $SiO_2$, is mixed with from 2 to 25 weight percent of $Y_2O_3$ using methanol or a solution of toluene and about 3 volume percent methanol to form a slurry and the slurry is milled with $Si_3N_4$ grinding media for about one hour to effect a uniform ball milled blend of the starting powders. The slurry is then dried and screened through a coarse mesh screen such as 50 to 100 mesh. The dried material may optionally be dry milled for about 3 to 50 hours prior to screening. The screened powder is then loaded into a graphite hot pressing die whose interior surfaces have previously been coated with boron nitride powder. The powder is then pre-pressed at about 2000 psi and then the die is placed in a chamber containing argon, and a pressure of about 500 psi is applied up to about 1200° C., and then pressure and temperature are increased simultaneously so that the ultimate pressure and temperature are achieved at about the same time. The densification process is monitored using a dial gauge indicating ram travel within the die body. A rate of downward movement of the ram cross head below about 0.004 inches per hour indicates completion of densification. At this point, the assembly is cooled slowly over a period of about 1 to 2 hours. Ultimate pressures and temperatures of from 3,000 to 5,000 psi and 1675° C. to 1800° C. for a time of about 2 to 3 hours are adequate conditions for the achievement of essentially full densification of the silicon nitride body.

Examples of five bodies containing $Y_2O_3$ produced by this process with different ratios of alpha phase to amorphous phase in the starting silicon nitride powder is shown in Table I. Mechanical strength is presented for some of the bodies of Table I in Table II, respectively.

All strength measurements are in terms of Modulus of Rupture (MOR in $psi \times 10^3$), and were made from room temperature to 1400° C. using a four point loading fixture with a 0.9 inch outer span and a 0.4 inch inner span, which stresses the specimen by cross bending. Specimen size was 0.050 inch by 0.100 inch by one inch. All hot pressed specimens were tested in the strong direction, with a cross-head speed of 0.02 inches per minute on an Instron machine. Strength was determined by the elastic beam formula, the dimensions of the test specimen and the test fixture. Theoretical density was calculated by the simple rule of mixtures for $Si_3N_4$ and $Y_2O_3$.

TABLE I

Hot Pressing Conditions for Silicon Nitride + $Y_2O_3$

| Powders (/A) | $Y_2O_3$ (weight percent) | Temperature (°C.) | Time (min) | Pressure (Ksi) | Density (% theoretical) |
|---|---|---|---|---|---|
| 1.5 | 3.4 | 1750 | 180 | 3 | 100.0 |
| 1.5 | 3.4 | 1825 | 125 | 5 | 100.0 |
| 1.5 | 8 | 1750 | 170 | 5 | 98.9 |
| 1.5 | 10 | 1725 | 105 | 3 | 98.7 |
| 1.5 | 13 | 1725 | 180 | 5 | 97.9 |

*$SiO_2$ content in the above compositions averaged about 3.5 weight percent.

TABLE II

Strength of Hot Pressed Silicon Nitride + $Y_2O_3$

| $Y_2O_3$ (weight percent) | Density (% theoretical) | MOR ($psi \times 10^3$) 23° C. | 1200° C. | 1400° C. |
|---|---|---|---|---|
| 3.4 | 100 | 115 | — | — |
| 8 | 98.9 | 135 | — | — |
| 10 | 98.7 | 137 | — | — |
| 13 | 97.9 | 129 | 93.7 | 47.5 |

Figure 2:
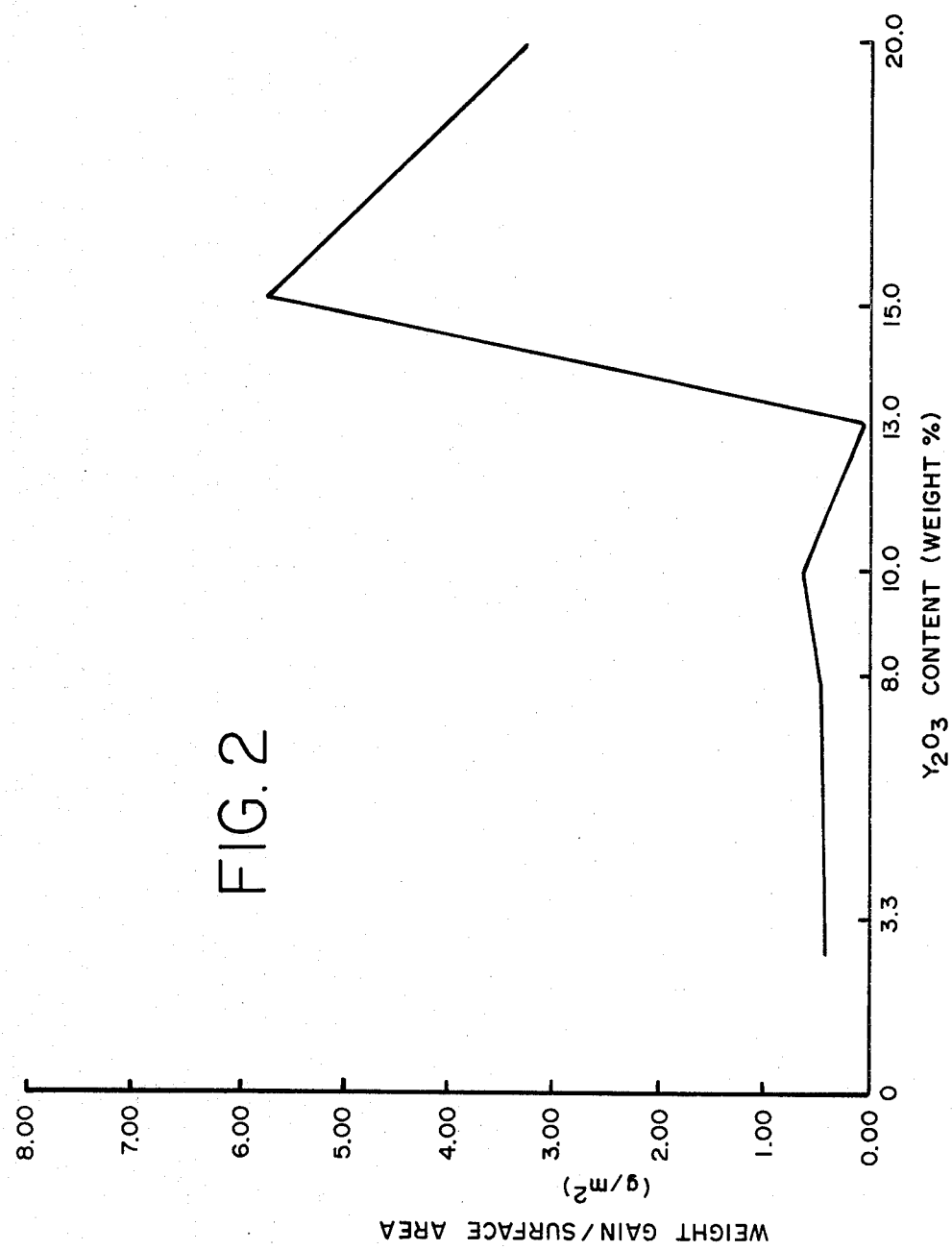
FIG. 2 is a plot of oxidation as indicated by weight gain per unit surface area on the vertical axis in grams per square meter, versus $Y_2O_3$ content in weight percent on the horizontal axis for an oxidation time of 6 hours at a temperature of 1200° C.

Referring now to FIG. 1 of the Drawing, which is a pseudoternary phase diagram for $Si_3N_4$, $SiO_2$ and $Y_2O_3$, after R. R. Wills et al., *J. Materials Science*, 11 (1976), p. 1305, it will be seen that there are three compatibility triangles labeled I, II, and III. In accordance with the invention, it has been discovered that compositions within compatibility triangles I and II, that is, those containing at least 3 weight percent $SiO_2$ and about 3 to 13 weight percent $Y_2O_3$, exhibit optimum oxidation resistance at elevated temperatures. Compositions containing about 3 weight percent $SiO_2$ and greater than 13 weight percent $Y_2O_3$ fall into compatibility triangle III and exhibit fair to poor oxidation resistance at elevated temperatures. This is illustrated graphically in FIG. 2, wherein weight gain per unit surface area in grams per square meters is plotted on a vertical axis versus $Y_2O_3$ content in weight percent on the horizontal axis. As may be seen from the figure, weight gain increases slightly between 3.3 and 8 weight percent $Y_2O_3$, increases slightly more between 8 and 10 weight percent $Y_2O_3$ and actually decreases between 10 and 13 weight percent $Y_2O_3$, whereas above 13 weight percent $Y_2O_3$ weight gain increases drastically to 15 weight percent $Y_2O_3$ and thereafter decreases at a moderate rate to 20 weight percent $Y_2O_3$. However even at 20 weight percent $Y_2O_3$ weight gain is approximately 7 times that between 3.3 and 10 weight percent $Y_2O_3$. Based upon such observation compositions containing from about 11 to 13 weight percent $Y_2O_3$ are preferred. Below about 3 weight percent $Y_2O_3$, its beneficial effect as a densifying and/or sintering aid is appreciably reduced.

The significantly decreased oxidation resistance within compatibility triangle III is caused by the presence of the 1:1 $Si_3N_4.Y_2O_3$ compound. Such compound is the only phase not common to compatibility triangles I, II, and III. Therefore, where $SiO_2$ is below about 3 weight percent, it may be expected that accompanying $Y_2O_3$ content which cause the composition to move into compatibility triangle III would result in substantially decreased oxidation resistance for the $Si_3N_4$ body.

While there has been shown and described what are at present considered the preferred embodiments of the invention, it will be obvious to those skilled in the art that various changes and modifications may be made therein without departing from the scope of the invention as defined by the appended claims.

What is claimed is:

1. A polycrystalline ceramic body consisting essentially of a composition of $Si_3N_4$, $SiO_2$ and $Y_2O_3$, said composition lying within a triangular region of the $Si_3N_4$-$SiO_2$-$Y_2O_3$ ternary composition diagram bounded by lines joining the points $Si_3N_4$, $Y_2O_3.2SiO_2$, $10Y_2O_3.9SiO_2.Si_3N_4$, and $Si_3N_4.Y_2O_3$, said compositions having from about 2 to about 4 weight percent $SiO_2$ and up to about 13 weight percent $Y_2O_3$.

2. The body of claim 1 wherein $Y_2O_3$ is present in the amount of about 11 to 13 weight percent.

3. The body of claim 2 wherein $SiO_2$ is present in the amount of at least 3 weight percent.

4. The body of claim 1 wherein cation impurities are below 0.1 weight percent.

* * * * *

UNITED STATES PATENT OFFICE
CERTIFICATE OF CORRECTION

Patent No. 4,350,771     Dated September 21, 1982

Inventor(s) J. Thomas Smith

It is certified that error appears in the above-identified patent and that said Letters Patent are hereby corrected as shown below:

Column 4, line 56, delete "a" and "region" and insert in place of "region" the word --regions--.

Signed and Sealed this

Fourteenth Day of August 1984

[SEAL]

Attest:

GERALD J. MOSSINGHOFF

Attesting Officer

Commissioner of Patents and Trademarks